Dec. 30, 1958 — H. D. WARSHAW ET AL — 2,866,378
FUEL TURBIDIMETER
Filed Jan. 14, 1957
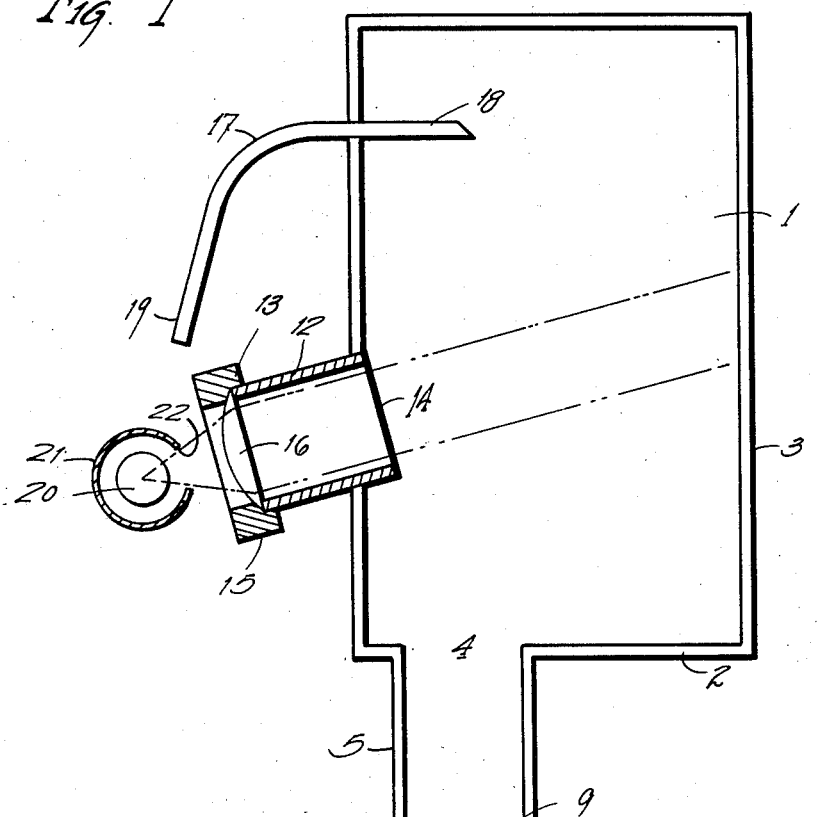
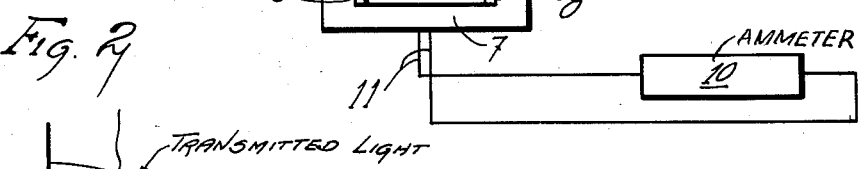
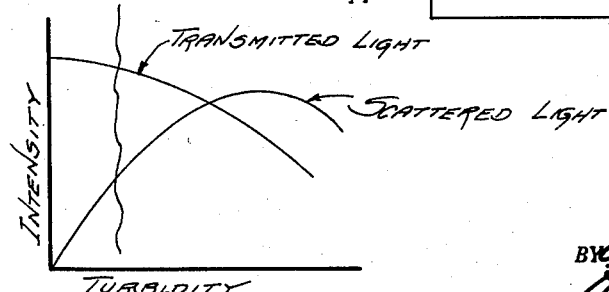
INVENTORS,
HOWARD D. WARSHAW,
ELDON NERHEIM United States Patent Office 2,866,378
Patented Dec. 30, 1958

2,866,378
FUEL TURBIDIMETER

Howard D. Warshaw, San Jose, Calif., and Eldon Nerheim, Minneapolis, Minn., assignors, by mesne assignments, to the United States of America as represented by the Secretary of the Navy Application January 14, 1957, Serial No. 634,133

1 Claim. (Cl. 88—14)

This invention relates to a fuel turbidimeter for use primarily in ascertaining low values of turbidity.

The ordinary turbidimeters in present use are limited in their ability to measure low values of turbidity because the photovoltaic cells are responsive to internal light reflections. To correctly ascertain true values of liquids having low turbidity, it is necessary to reduce the ambient light level well below the scattered light level. The instant invention discloses a fuel turbidimeter that is designed to keep the ambient light detection of the photovoltaic cell to a minimum.

The low turbidity fuel turbidimeter operates by measuring scattered light as a function of the turbidity of a liquid. From a study of the turbidity vs. intensity curves, it is seen that in the low turbidity region the scattered light changes very rapidly for small increments of particle concentration change. In the same region, the transmitted light remains essentially constant.

In the instant invention a single photovoltaic cell is used to detect both the scattered light and the transmitted light beam. A lens collimates a beam of light to illuminate any particles held in suspension. The light scattered by the particles is detected by the photovoltaic cell. To calibrate the apparatus, light is transmitted through a quartz rod to the liquid where it is detected by the photovoltaic cell. If the microammeter connected to the photovoltaic cell does not register at a predetermined position for the transmitted light, the voltage on the lamp is adjusted. Thus, a correct reading of the turbidity of the fluid is always assured.

An object of this invention is to provide a low turbidity fuel turbidimeter that measures scattered light as a function of the turbidity.

It is a further object of this invention to provide a low turbidity fuel turbidimeter that maintains the ambient light level well below the scattered light level.

It is a further object of this invention to provide a low turbidity fuel turbidimeter wherein the photovoltaic cell that detects the scattered light is calibrated by the transmitted light from the same source.

Other objects and many of the attendant advantages of this invention will be readily appreciated as the same becomes better understood by reference to the following detailed description when considered in connection with the accompanying drawings wherein:

Figure 1 is a view of the fuel turbidimeter.
Figure 2 is a plot of the turbidity vs. intensity curves.

As shown in Figure 1, the fuel turbidimeter has a sampling head 1 having a base 2 and side walls 3. The fuel is introduced into the sampling head 1 where its turbidity is measured.

In one corner of the base 2 there is an opening 4. A tube 5 having a threaded end 6 is secured to the base 2 so that the opening 4 is enclosed by the tube. The tube 5 is closed by a cap 7 having a mating threaded portion 8 for the threaded end of the tube 5. A photovolatic cell 9 is secured to the inner side of the cap 7. The photovoltaic cell 9 is connected to an ammeter 10 by a pair of leads 11 coming from the cap 7.

An open ended tube 12 is mounted in a side wall 3 adjacent the corner of the base 2 housing the photovoltaic cell 9. The tube 12 is threaded at its outer end 13 and is open at the inner end 14 to the interior of the sampling head 1. A lens housing 15 carrying the lens 16 has a mating threaded portion for engagement with the threaded end 13 of the tube 12. The tube 12 is mounted in the side wall 3 so that the extended longitudinal axis of the tube 12 will form an included angle of 85° with the extended longitudinal axis of the tube 5.

Directly above the tube 12 in the same side wall 3 there is mounted an angled quartz rod 17. The one end 18 of the quartz rod extends into the sampling head 1 and the other end 19 is adjacent the lens 16.

Mounted adjacent to but spaced from the lens 16 and the end 19 of the quartz rod, there is an assembly housing the lamp 20. A rotatable cover 21 having an aperture 22 surrounds the lamp 20. The cover 21 is rotated so that the lamp 20 shines through the aperture 22 to illuminate either the lens 16 or the quartz rod 17 as desired.

In operation, the apparatus functions to measure the turbidity of a fluid contained in the sampling head.

As shown in Figure 2, in the low turbidity regions, the scattered light curve changes very rapidly for small increments of particle concentration change while the transmitted light remains essentially constant. The lamp cover is rotated so that the aperture 22 is directed toward the end 19 of the quartz rod 17. Light is thereby piped through the rod and reflected to the fluid by the inner end 18. The light is picked up by the photovoltaic cell 9 to induce a cell voltage which deflects the microammeter. If the pointer of the meter does not indicate a predetermined mark, then the lamp voltage is adjusted until the meter indicates the desired position.

The lamp cover is then rotated until the aperture is in position to illuminate the lens 16. The lens collimates the beam to reduce possible internal light reflections from the tubing and the walls. Any particles held in suspension in the fluid contained in the sampling head are illuminated by the collimated beam. The photovoltaic cell 9, at approximately right angles to the beam, detects any light scattered by particles in the light beam within the viewing scope of the photovoltaic cell. The scattered light falling on the photovoltaic cell generates a current which is measured on the ammeter 10 calibrated to read low values of p. p. m. (parts per million particle concentration) from 0 to 10 p. p. m.

The low turbidity fuel turbidimeter eliminates the possibility of any direct ray of light reaching the photovoltaic cell by recessing the lens and the photovoltaic cells in tubes. This also excluded the probability of getting a single reflection of light to the cell. Higher order reflections are possible but their probability was reduced by tilting the lens tube. Also the sampling head size is controlled so that the cell cannot view any area that could be directly illuminated by the collimated beam. The location of the lens tube and the photovoltaic cell in one corner of the head further increases the order of reflection required to reach the cell. If desired, a lens could be positioned over the photovoltaic cell which would reduce the light receiving area of the cell, in the manner of an aperture in a screen so positioned. The cell would then react only to the light collimated by the lens and obviously the order of stray light reflections which would reach the cell would be increased.

Obviously many modifications and variations of the present invention are possible in the light of the above teachings. It is therefore to be understood that within the scope of the appended claim the invention may be practiced otherwise than as specifically described.

What is claimed is:

A device for determining turbidity of a fluid by measuring scattered light as a function of turbidity using light from the same source for calibrating the device, comprising a head including sidewalls integrally connected at substantially right angles to a base defining a chamber for containing fluid the turbidity of which is to be determined, said base and one side wall each having an aperture disposed substantially adjacent the corner between them; a first tube positioned perpendicularly to said base in the base aperture and secured at one end to said base, said one end opening into said chamber; a photovoltaic cell housed in said first tube near the other end of said tube for generating current in proportion to the intensity of light falling on it from said chamber; an ammeter electrically connected to said cell for indicating the current so generated; a second tube mounted in the aperture of said one side wall and having one end secured to said side wall and opening into said chamber, said tube having its other end tilted in the direction of said base wherein the axes of said first and second tubes when extended form an included angle of approximately 85°; a lens secured in said second tube near its other end for collimating light through said second tube into said head substantially across the aperture in said base wherein scattered light only will reach said cell; said one side wall having a second aperture, a quartz rod mounted in said second aperture of said one side wall having one end extending into said chamber and terminating substantially over said aperture in said base at a distance from said cell substantially equal to the distance scattered light from the lens must travel to reach the photovoltaic cell; the other end of said rod extending from said head terminating adjacent said other end of said second tube; a source of light, the intensity of which may be varied, disposed adjacent said other ends of said quartz rod and second tube and adapted for introducing light into the lens and said quartz rod; a cover surrounding said light source and having an aperture adapted for selectively permitting light to enter said rod or lens, so that light may be introduced into said rod to the exclusion of said lens, and transmitted through said fluid, and the intensity of said light source varied to produce a predetermined reading on said ammeter, thus calibrating said device before directing light only through said lens for producing a scattered light reading.

References Cited in the file of this patent

UNITED STATES PATENTS

| 1,828,894 | Freygang | Oct. 27, 1931 |
| 2,486,622 | White | Nov. 1, 1949 |

FOREIGN PATENTS

| 668,433 | Great Britain | Mar. 19, 1952 |